United States Patent [19]

Day et al.

[11] Patent Number: 4,591,885

[45] Date of Patent: May 27, 1986

[54] ION PROJECTION COPIER

[75] Inventors: Gene F. Day, Cupertino; Lloyd D. Clark, San Francisco, both of Calif.

[73] Assignee: Xerox Corporation, Stamford, Conn.

[21] Appl. No.: 646,549

[22] Filed: Sep. 4, 1984

[51] Int. Cl.[4] .............................................. G01D 5/36

[52] U.S. Cl. ..................................... 346/159; 346/155

[58] Field of Search ................. 346/155, 159; 358/300

[56] References Cited

U.S. PATENT DOCUMENTS

| | | | |
|---|---|---|---|
| 3,323,131 | 5/1967 | MacGriff | 346/155 |
| 3,594,162 | 7/1971 | Simm et al. | 346/159 X |

*Primary Examiner*—A. Evans

*Attorney, Agent, or Firm*—Serge Abend

[57] ABSTRACT

An ionographic copier based upon the fluid jet assisted ion projection electrographic marking process. A light sensitive ion modulation assembly is used for controlling the flow of ions in accordance with dark and light patterns of raster line optical information projected from an original to be copied.

13 Claims, 7 Drawing Figures

Figure 1:
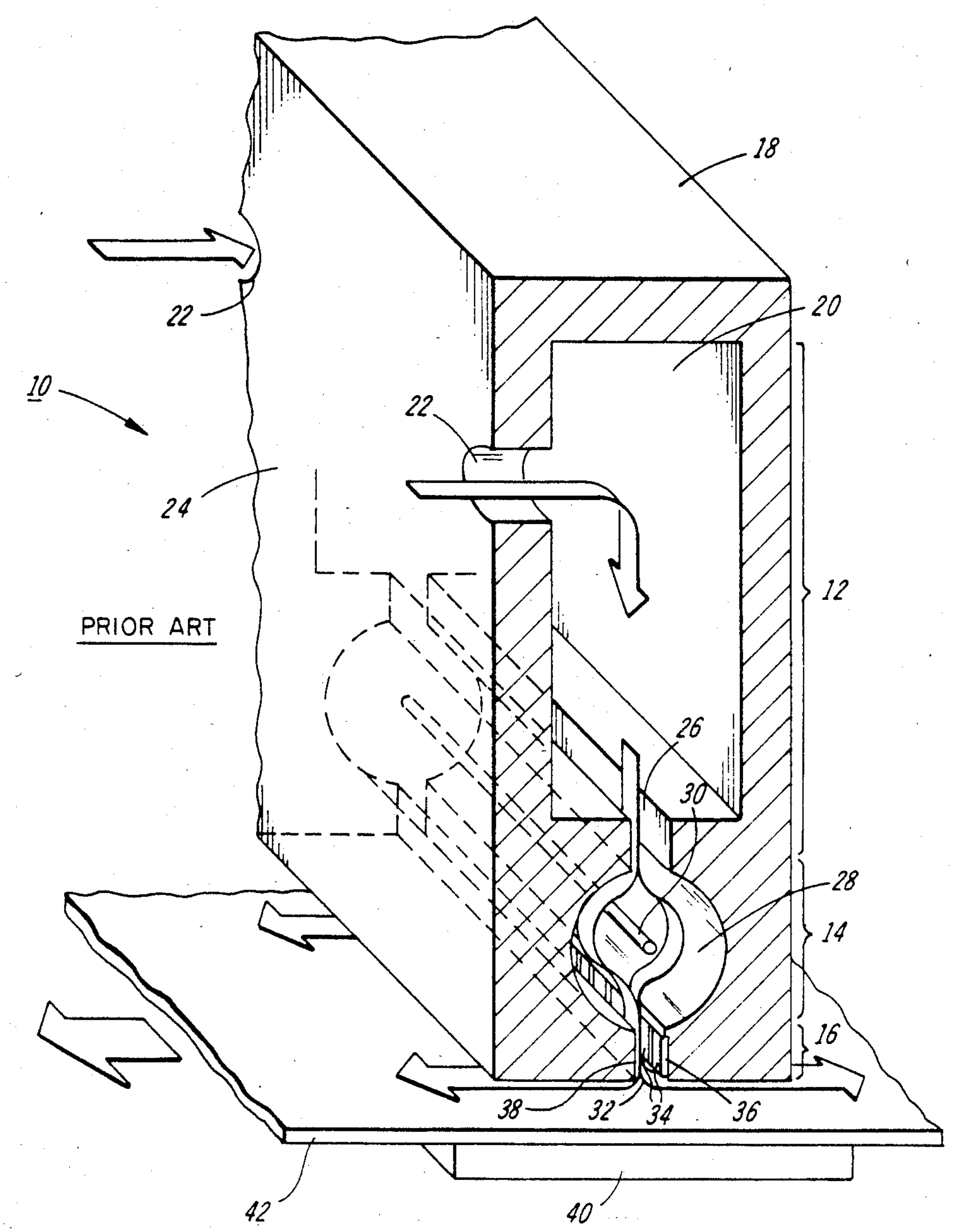

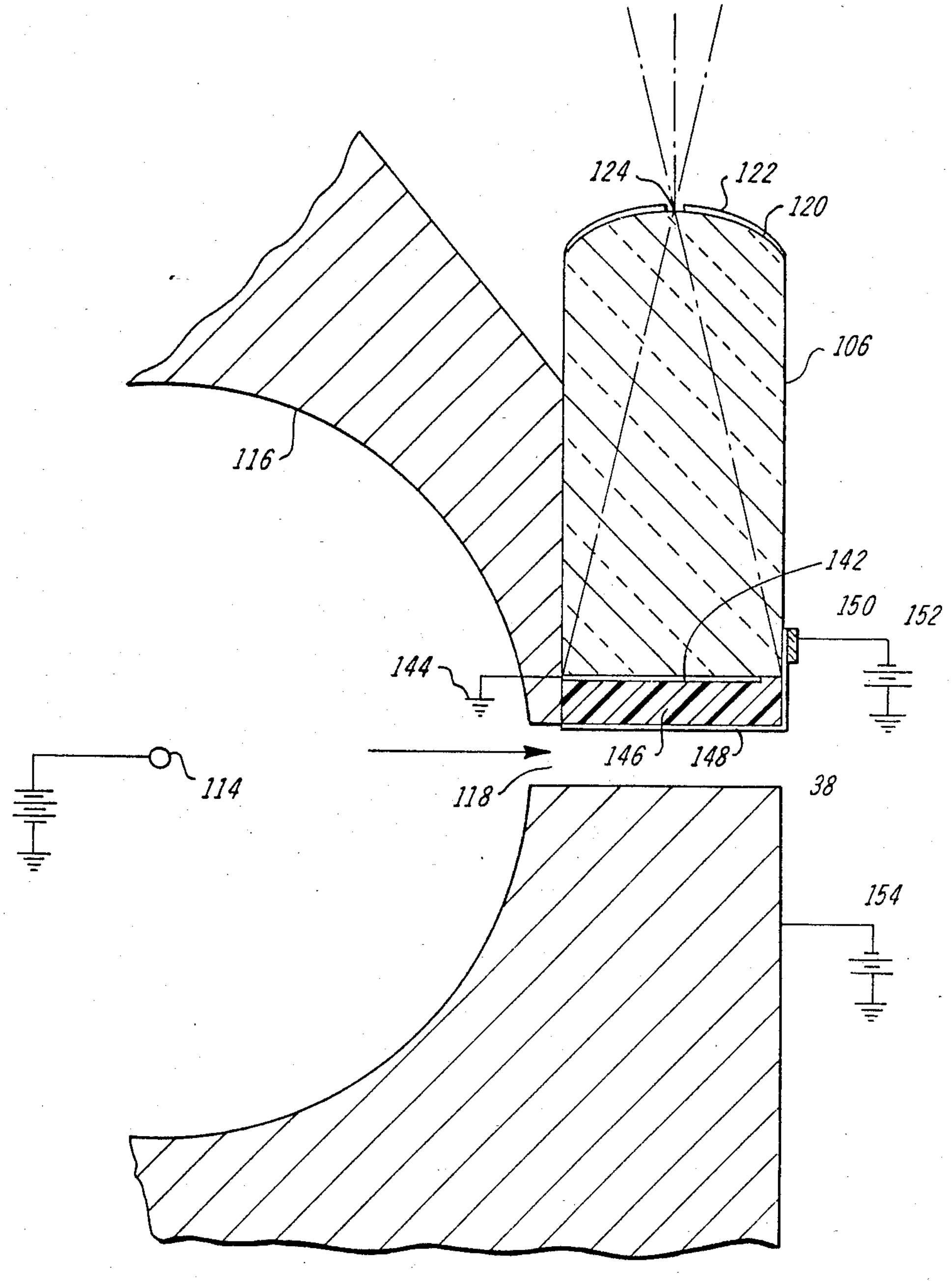
F/G. 7

ION PROJECTION COPIER

This invention relates to a copier based upon the fluid jet assisted ion projection electrographic marking process. A light sensitive ion modulation assembly is used for controlling the flow of ions in accordance with optical information projected from an original to be copied.

The imaging concept utilized herein is described with respect to a fluid jet assisted ion projection printer in commonly assigned U.S. Pat. No. 4,463,363 issued July 31, 1984 in the names of Robert W. Gundlach and Richard L. Bergen, and entitled "Fluid Jet Assisted Ion Projection Printing". In the printer described in that patent, a supply of imaging ions are first generated and then are placed upon a moving receptor sheet, such as paper, by means of a linear array of selectively controllable, closely spaced, minute air "nozzles". The ions of a single polarity, preferably positive, are generated in an ionization chamber by a high voltage corona discharge and are then transported to and through the "nozzles" where they are electrically controlled, within each "nozzle" structure, by an electrical potential applied to modulating electrodes therein. Selective application of control voltages to the modulating electrodes in the array will enable spots of charge of charge to appear on the receptor sheet for subsequent development.

A typical modulating structure for this type of printer is disclosed in commonly assigned copending U.S. Patent Application Ser. No. 481,132 filed Apr. 1, 1983 in the names of Nicholas K. Sheridon and Michael A. Berkovitz and entitled "Modulation Structure For Fluid Jet Assisted Ion Projection Printing Apparatus". A planar marking head is mounted on the ion generating housing and each electrode thereon is addressed individually for modulating each nozzle independently.

The printers described in the Gundlach et al patent and the Sheridon et al application perform upon the imposition of electrical data on their modulation electrodes. The data may be computer generated and applied by any conventional data addressing technique.

It would be highly desirable to utilize the principle of the fluid jet assisted ion projection process, as described in the Gundlach et al patent, to copy original images onto an image receptor. We have discovered that this may be accomplished by causing an optical input to address a light sensitive modulation assembly. Therefore, since this marking process is inherently inexpensive to manufacture and is capable of high resolution output, a low cost copier is feasible.

The present invention may be carried out, in one form, by providing a charge receptor, an optical system for projecting incremental images of dark and illuminated areas of an original to be copied, and an optically controlled ion projector for placing ions upon the charge receptor in accordance with the projected incremental images of dark and illuminated areas of the original. The ion projector ions includes an ion generator and a source of transport fluid for driving the ions out of the ion generator through an exit channel defined by a pair of walls, and a modulation assembly adjacent said exit channel for controlling the passage of ions therethrough. The modulation means comprises a first source of potential connected to one of the channel walls, a light collector through which the images of dark and illuminated areas are projected, and optically switchable means adjacent the light collector which forms the other channel wall. A second source of potential, substantially identical to the first source of potential and a source of reference potential, different from the first and second potentials, are connected across the optically switchable means whereby when the optically switchable means is dark the other channel wall is at the second potential and when the optically switchable means is illuminated the other channel wall is at the reference potential.

Other objects and further features and advantages of this invention will be apparent from the following description considered together with the accompanying drawings, wherein:

FIG. 1 is a perspective view showing the fluid jet assisted ion projection printing apparatus of U.S. Pat. No. 4,463,363.

Figure 2:
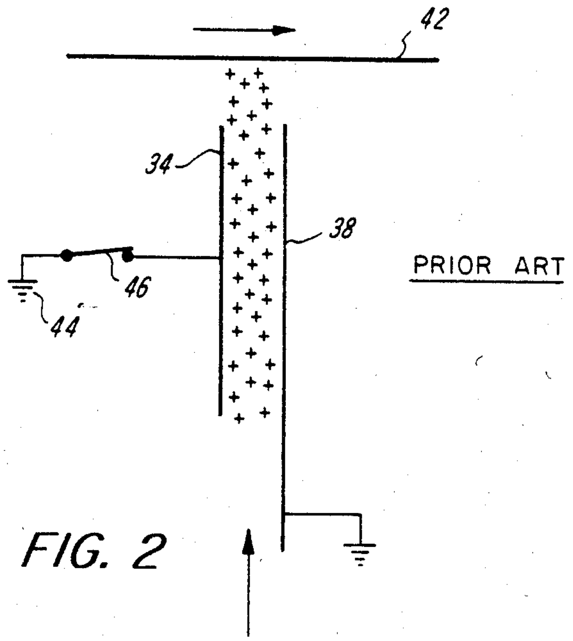
Figure 3:
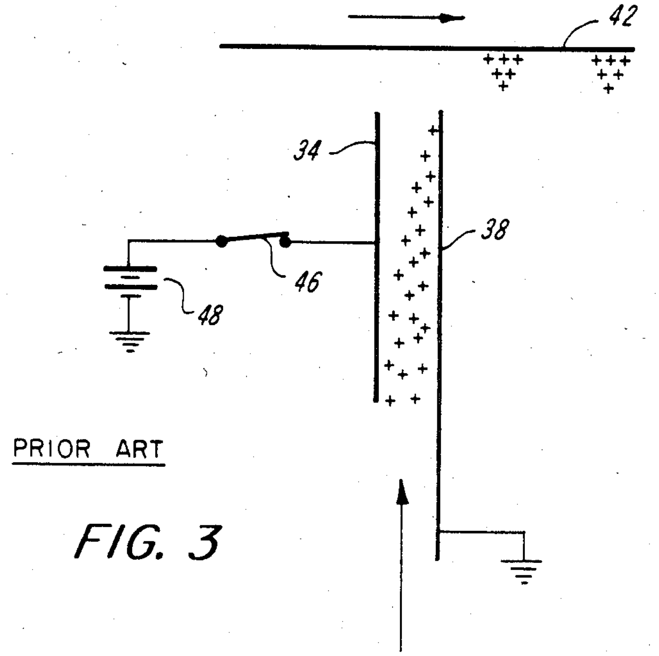
Figure 4:
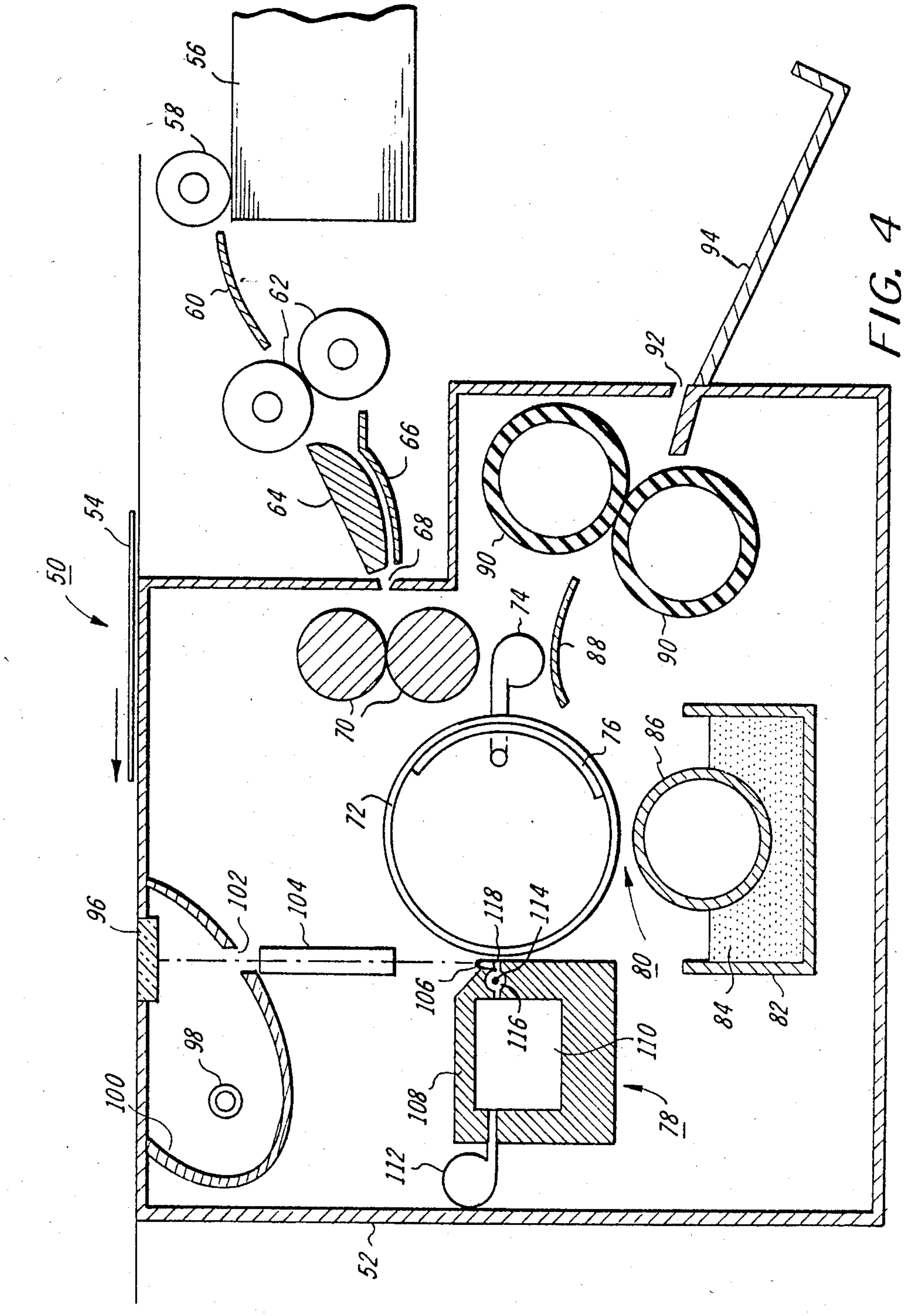
Figure 5:
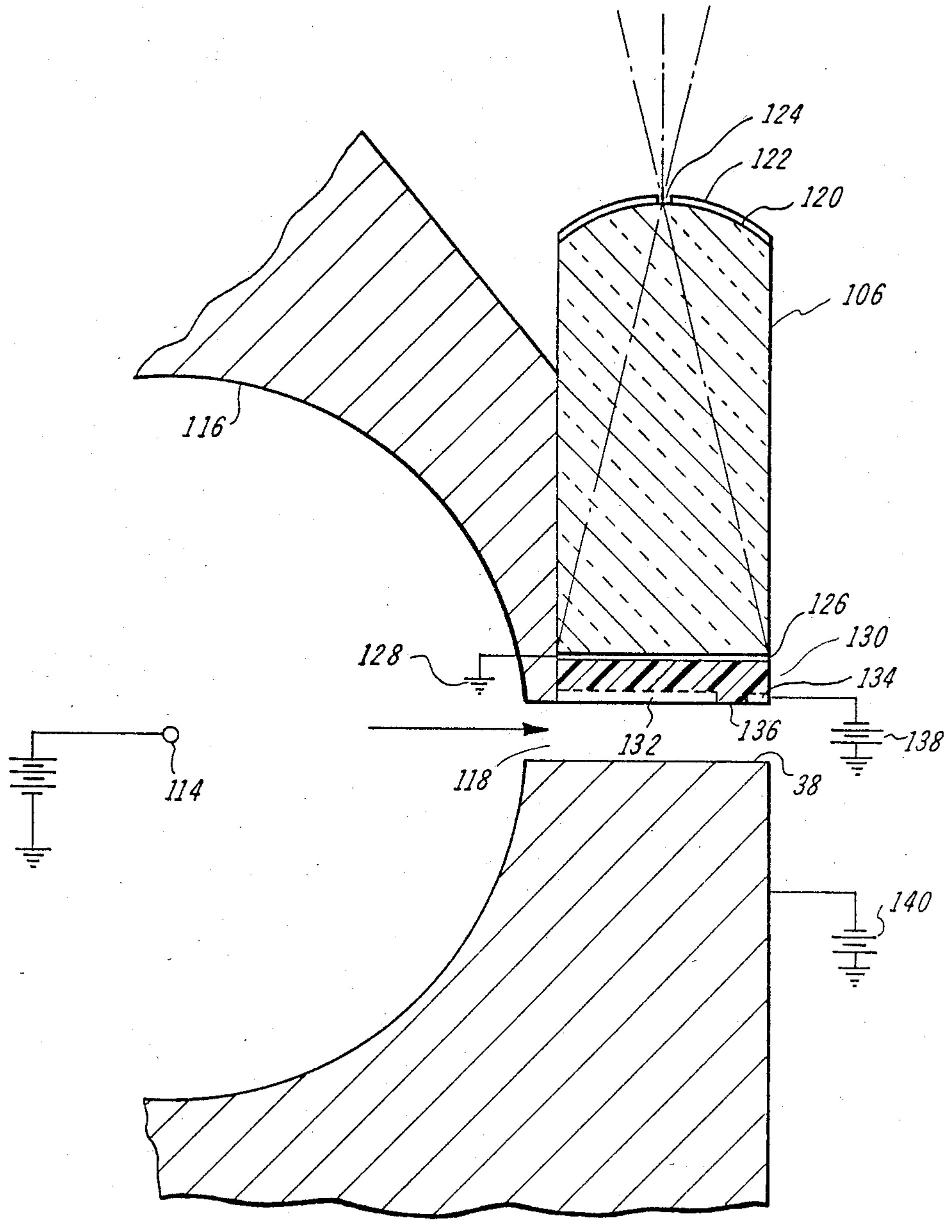
Figure 6:
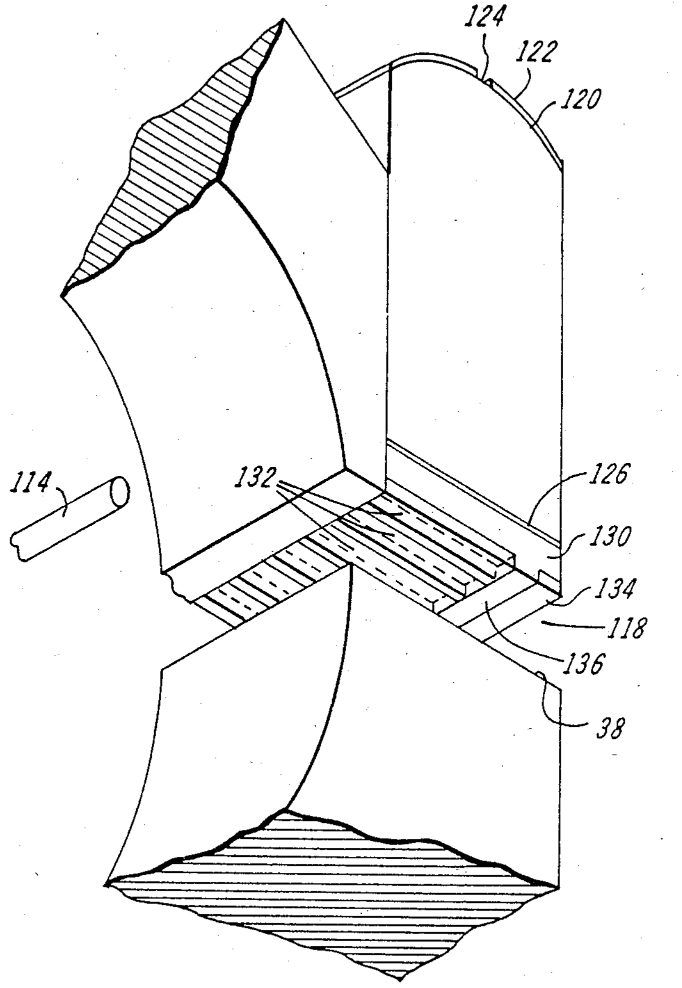

FIG. 2 is a schematic representation of the modulation structure of FIG. 1 showing "writing", FIG. 3 is a schematic representation of the modulation structure of FIG. 1 showing "writing" being inhibited, FIG. 4 is an elevation view showing a copier apparatus utilizing the fluid jet assisted ion projection marking engine, FIG. 5 is an enlarged partial elevation view showing one form of the light sensitive modulation portion of the ion projection apparatus, FIG. 6 is a bottom perspective view of the light sensitive modulation assembly of FIG. 5, FIG. 7 is an enlarged partial elevation view showing another form of the light sensitive modulation portion of the ion projection apparatus.

With particular reference to the drawings, there is illustrated in FIG. 1, by way of example, an ion projector 10 comprising three operative zones; a fluid pressure distribution zone 12, an ion generation zone 14, and an ion modulation zone 16, within housing 18. Fluid pressure distribution zone includes a plenum chamber 20 into which an ionizable fluid, such as air, may be introduced through several openings 22 passing through side wall 24. Pressurized air is allowed to escape from the plenum chamber 20 through metering inlet channel 26 into a cylindrical ion generation chamber 28 having electrically conductive walls, substantially surrounding a corona generating wire 30, connected to a high potential source. Air escapes from the chamber 28 through exit channel 32, within which, and along one of two opposing walls thereof, are a number of spaced, electrically controlled, modulation electrodes 34 mounted upon an insulating substrate 36, and extending in the air flow direction. The opposite wall 38 of the exit channel serves as a reference electrode and is connected to a source of reference potential, such as ground.

Spaced from the ion projector 10 is a backing electrode 40 connected to a high potential source (not shown) of a polarity opposite to that of the ions. A planar charge receptor sheet 42, such as paper, passes over the backing electrode. Ions allowed to escape the ion projector, through the exit channel 32, are accelerated by the backing electrode toward the charge receptor sheet where they accumulate in an image configuration and are subsequently made visible at a development station (not shown).

A schematic representation of the modulation region is illustrated in FIGS. 2 and 3. A single modulation electrode 34 and a portion of the grounded opposite wall 38 are illustarted. These elements bridge the gap across the exit channel 32, and comprise a capacitor, across which a low voltage control potential may be selectively applied. Thus, an electric field, extending in a direction transverse to the direction of the transport fluid flow, may be established between the modulation electrode and the opposite wall. As the ions under the influence of a given modulation electrode are relatively unaffected by the adjacent electrodes, they may be viewed as individual "beams".

"Writing" of a single spot in a raster line is illustrated in FIG. 2 in which a single "beam" is considered. This condition is accomplished when the modulation electrode 34 is connected to a ground potential source 44 through switch 46. Since there will be no field extending across the exit channel 32, ions passing therethrough will be unaffected and will deposit on the charge receptor sheet 42. Conversely, when the modulation electric field is applied, by closing switch 46 and application of the low voltage potential of source 48 to the modulation electrode 34, a charge of the same sign as the ionic species is imposed upon the electrode. A field will extend across the exit channel 32 and the ion "beam" will be repelled (as illustrated in FIG. 3) and driven into contact with the opposite, electrically grounded, conductive wall 38 where the ions may recombine into uncharged, or neutral, air molecules. Transport fluid exiting from the ion projector, in that "beam" zone, will carry no "writing" ions. Thus, an image-wise pattern of information is formed by selectively controlling each of the modulation electrodes in the array, so that the ion "beams" associated therewith either exit or are inhibited from exiting the housing, as desired.

The overall configuration of a suggested copier 50 incorporating the ion projection "writing" process is described with reference to FIG. 4. Although a direct writing process, in which the copy is made directly upon a receptor sheet, such as plain or dielectric paper, is shown, it should be understood that this is only by way of example. Clearly, a transfer process is also feasible, wherein an image is initially made upon the surface of a dielectric drum and is then transferred to a receptor sheet.

The copier 50 includes a housing 52 over which an original 54 passes to be optically scanned. An image of the original will be copied on a sheet, preferably ordinary paper, removed from a stack of receptor sheets 56 by stripping roller 58. As the uppermost sheet is removed from the stack, it is deflected by guide plate 60 into the nip of drive rollers 62 which in turn direct it between a hot shoe 64 and its associated guide plate 66. The purpose of the hot shoe is to preheat the paper, to approximately 150° to 160° C., in order to drive out moisture and render it less conductive, so that it can retain a charge. About two-thirds of the moisture content is driven off during heating, from about 6% to about 2% by weight. Clearly this portion of the machine must be adequately vented to prevent moisture accumulation.

Once heated and dried, the sheet 54 passes through a narrow entrance slot 68 into the interior of the substantially air-tight housing 52. By severely limiting the introduction of external air into the housing, the interior may be maintained at a low ambient humidity, so that the sheet does not reabsorb moisture and become conductive again. This is extremely important since in order for ordinary paper to retain a charge image, it should be dry enough that its dielectric relaxation time is longer than the time between image creation and toning.

Furthermore, since hot paper, even when it has been dried, will not hold a charge, it must be cooled. Essentially, the moisture cannot be totally driven out and the paper, when hot, will be more conductive when hot than when cool. The only practical way to make ordinary paper sufficiently insulating to retain a charge image on its surface is first to heat it to drive off about two-thirds of the water and then to cool it so that the remaining water content does not present a problem. In this way, sheet resistivities on the order of $10^{15}$ ohms/sq range are possible. Therefore, immediately after entering the housing, the sheet is passed between cooling rollers 70 which reduce the temperature of the hot paper to a level where it will be less conductive. In this manner, the sheet can be made to retain a charge image for a sufficient length of time.

From the cooling rollers 70 the sheet passes to a porous, electrically conductive, transport drum 72 which can take many forms, such as, a fine mesh screen, pressed powdered metal, a fiber mat, or other equivalent configurations. Being air permeable, a suitable suction device, such as air pump 74, will create a lower pressure at the interior of the drum for attracting and retaining a sheet thereon and transporting the sheet past imaging processing stations. Being electrically conductive, it will perform its function as a backing electrode and will attract imaging ions to the sheet. An air impervious plate 76 is positioned at the interior of the drum, extending between the one o'clock and five o'clock positions. Thus, in the region of plate 76, no attractive force will be present at the exterior of the drum, in that sector, and release of the sheet will be readily effected.

The sheet is next transported past the imaging station (to be described in detail below) where ions, exiting the ion projector 78, are deposited, in image configuration on the sheet. Once past the imaging station, the latent image is made visible at a development station 80, preferably comprising a trough 82 containing a magnetic monocomponent toner 84 and a magnetic brush roller 86. As the roller 86 rotates through the trough, it attracts toner and transports it into contact with the sheet on the transport drum 72. Toner is attracted from the brush roller to the ion image.

As the lead edge of the sheet passes the five o'clock position of the transport drum 72 the sheet will be released and its beam strength directs it to guide plate 88 for redirection into the nip of fuser rollers 90. Finally, the completed copy is directed out of the housing through a narrow exit slot 92 into catch tray 94.

Having described the copy sheet transport path and the associated copy processing elements, the optical system shall now be discussed. As stated above, the original 54 is moved across the upper surface of the housing 52. This may be accomplished by conventional means, such as a reciprocating platen. During its path of travel, the original traverses a window 96 through which its image may be projected. In order to project enough light energy through the optical system, the original is illuminated by an elongated light source 98, which may take the form of a quartz iodine filament lamp, or some similar device. Additionally, a reflector 100 encircles the lamp for collecting and reflecting the lamp's light energy onto the original. As shown, the reflector is elliptical in shape and the lamp 96 is placed at one of its focuses. Its other focus is preferably located in the plane of the original 54. A narrow elongated opening 102 through the wall of the reflector 100 allows the image of a narrow band of the original (represented by the dotted line) to pass therethrough.

A lens system, preferably in the form of a short optical length elongated lens strip 104 of the Selfoc or graded index focusing type receives the projected image and focusses it upon an elongated light collector 106, which may be in the form of an elongated ribbon, about 40 mils wide, of suitable light transmissive material, such as sapphire. As illustrated, the light collector is mounted upon the ion projector 78, at the ion modulation zone, and serves a two-fold purpose, its upper end collects the optical image and its lower end controls the ion output in accordance with the illumination pattern.

The ion projector 78 is similar to that shown in FIG. 1, with the exception that the ion modulation structure is directly optically controlled rather than being controlled by electrical input signals. It comprises a housing 108 having a plenum chamber 110 into which pressurized air is pumped by blower 112. Air flows from the plenum chamber over corona wire 114 in cylindrical ion generation chamber 116, and passes out of the housing through exit channel 118. The exit channel includes the optical ion modulation structure whose details of construction are most clearly seen in FIGS. 5 to 7.

The projected image of a narrow band of the original will be focussed upon the curved upper surface 120 of light collector 106. By coating the upper curved surface with a thin layer 122 of opaque material, having a very narrow slot 124 of about 2 mils width only a single raster line of information will control the ion flow. The curved upper surface 120 will spread the raster line image uniformly, only in the air flow direction, as shown, leaving the projected raster line image unaffected and in sharp focus in the direction transverse to the air flow.

Ion modulation by optical means, in accordance with this invention, may be achieved with any number of configurations. In its generic form it is based upon the principle that a photoconductive layer in the dark can support an applied voltage equal to a reference voltage applied to the opposite wall. When light impinges upon the photoconductor, it becomes conductive and will shift the surface voltage on the modulating lip of the exit channel to approach that of an adjacent grounded substrate.

In the preferred embodiment, illustated in FIGS. 5 and 6, a thin transparent conductive layer 126, such as NESA glass (Sn, $InO_2$), about 0.05 microns thick, is disposed upon the lower surface of the light collector 106. A source of reference potential 128, such as ground, is connected to the NESA layer. A bulk photoconductive layer 130, preferably amorphous silicon (a-Si:H), about 1 to 2 mils thick, is disposed adjacent the NESA layer. The exposed surface of the photoconductive layer is suitably masked and doped to a depth of about 0.1 mils to form a series of parallel p-type fingers 132 and an $n^+$-type crossbar 134. Preferably, the fingers extend in the air flow direction about 35 mils long and are about 3.5 mils wide separated from one another by about 1.5 mils of undoped a-Si:H. They are separated from the crossbar 134 which extends transversely to the air flow direction by an isolator strip 136 of undoped a-Si:H, approximately 3 mils wide.

A potential source 138 of, for example, −20 volts d.c., is applied to the crossbar 130. A potential source 140, of the same magnitude and polarity as on the crossbar, is connected to the opposite wall 38 of the exit channel 118. In the dark, the bulk photoconductive layer 130, including the isolator strip 136, is insulating. However, because the width of the isolator strip is small, the space charge limited current through the isolator strip, between the biased crossbar 134 and the fingers 132, maintains a bias on the fingers of substantially −20 volts d.c. The bulk photoconductive layer will be unaffected by the crossbar bias because of its relatively high effective impedance as compared with the impedance of the isolator strip. At the same time, the impedance of the isolator strip must be made large compared to the impedance of the illuminated bulk layer 126.

Thus, in the absence of light, the entire modulation side of the exit slot is maintained at a potential of −20 volts d.c., as is the opposite wall 38. As the field across the channel is substantially zero, ions traveling therethrough will be unaffected and are allowed to pass out of the ion projector to be deposited upon a charge receptor sheet. On the other hand, when light strikes the bulk a-Si:H photoconductive layer 130, it becomes conductive, effectively forming a short circuit between the grounded NESA layer 126 and the doped fingers 132 and driving the fingers substantially to ground potential. As the opposite wall is maintained at −20 volts d.c. the field across the exit channel drives the ions (usually positive) passing therethrough to the opposite wall to inhibit their exiting from the ion projector.

It should be understood that when copying an original, incremental areas along the raster line are alternately dark and light in accordance with the image information. This image information will incrementally control the bias on individual fingers in the manner described. With the crossbar 134 extending in the direction of and coextensive with the raster line, the −20 volts d.c. may be applied to any of the non-illuminated fingers 132, while the illuminated fingers will be shorted to the grounded NESA layer 126.

An alternate embodiment is illustrated in FIG. 7. The light collector 106 is provided with a different photosensing configuration in the modulation region. A thin (e.g. 0.05 microns) conductive layer 142, such as NESA glass, extends fully across the light collector in the raster line dirction and almost all the way across the light collector in the air flow direction. This conductive layer is connected to a source of reference potential 144, such as ground. A bulk undoped crystalline silicon layer 146, about 50 to 60 microns thick, extend uniformly across the bottom of the light collector. A thin (e.g. less than 1 micron) resistive layer 148, preferably of p-type amorphous silicon, having a resistance of about $10^9$ ohms/$cm^2$, extends over the exposed surface of the bulk crystalline silicon layer 146 and along the side wall of the light collector 106. Metal contact electrode 150 mounted upon the resistive layer 146 connects it with a potential source 152 of about −20 volts d.c. Another potential source 154 of the same polarity and magnitude is connected to the opposite wall 38 of the exit channel 118. Although the photoconductor controlled modulation region of this embodiment does not have fingers for discrete area control, as does the embodiment of FIGS. 5 and 6, the sheet resistance of the amorphous silicon layer 146 allows dark and light areas of the projected raster line to control similar lateral portions adjacent the exit channel.

In operation, in the dark areas, the bulk silicon layer acts like an insulator so that the voltage on the surface of the amorphous silicon resistive layer 148 is determined by the applied voltage of the source 152. Since the voltage on the opposite wall 38 is the same, the ions will exit the ion projector. In the illuminated areas the bulk crystalline silicon layer 146 becomes conductive and effectively shorts out the applied voltage. The thin amorphous silicon layer 148 should have a high enough resistance so that it cannot supply enough current to maintain the applied potential and the surface potential will approach ground. This condition will establish a field across the exit channel 118 and will deflect ions, inhibiting their passage through the ion projector.

It should be understood that the present disclosure has been made only by way of example and that numerous changes in details of construction and the combination and arrangement of parts may be resorted to without departing from the true spirit and the scope of the invention as hereinafter claimed.

What is claimed is:

1. A fluid jet-assisted ion projection copier characterized by comprising a charge receptor, means for projecting incremental images of dark and illuminated areas of an original to be copied, means for projecting ions upon said charge receptor in accordance with said projected incremental images of dark and illuminated areas of said original, said means for projecting ions including an ion generator and a source of transport fluid for driving ions out of said ion generator through an exit channel defined by a pair of walls, and modulation means adjacent said exit channel for controlling the passage of ions therethrough, said modulation means comprising:

a. a first source of potential connected to one of said walls, b. a light collector through which said images of dark and illuminated areas are projected, c. optically switchable means located to receive light from said light collector and including first conductive means, second conductive means and photoconductive means sandwiched between said first and said second conductive means, and wherein said second conductive means forms the other of said walls, d. a second source of potential, substantially identical to said first source of potential, electrically connected to said second conductive means, e. a source of reference potential, different from said first and second potentials, connected to said first conductive means, whereby when portions of said optically switchable means are dark, corresponding portions of said other wall maintain said second potential and when portions of said optically switchable means are illuminated, corresponding portions of said other wall maintain said reference potential.

2. The fluid jet ion projection copier as defined in claim 1 characterized in that said light collector comprises a transparent body having a curved illumination entry surface for spreading optical information across said switchable means in the ion flow direction.

3. The fluid jet ion projection copier as defined in claim 2 characterized in that a thin opaque layer having a centrally located slit extending in a direction transversely to said ion flow direction overlies said curved illumination entry surface.

4. The fluid jet ion projection copier as defined in claim 1 characterized in that said photoconductive layer comprises an amorphous silicon layer and said second conductive means is disposed adjacent said exit channel and comprises an array of fingers extending in the ion flow direction and a crossbar, spaced from the ends of said fingers, extending in a direction transversely to said ion flow direction.

5. The fluid jet ion projection copier as defined in claim 4 characterized in that said first conductive means comprises a NESA layer, said amorphous silicon layer is substantially undoped and said array of fingers and said crossbar are doped amorphous silicon separated by an isolator strip of said substantially undoped amorphous silicon.

6. The fluid jet ion projection copier as defined in claim 1 characterized in that said photoconductive layer comprises a crystalline silicon layer and said second conductive means is disposed adjacent said exit channel and comprises a doped amorphous silicon layer.

7. The fluid jet ion projection copier as defined in either claim 1, 2 or 3 characterized by further including a housing for enclosing a number of processing stations, transport means within said housing for moving said charge receptor past said processing stations, one of said processing stations comprising said means for projecting ions, and another of said processing stations comprising development means for rendering said charge image visible on said charge receptor.

8. The fluid jet ion projection copier as defined in claim 7 characterized in that said charge receptor is a sheet of paper, said housing is provided with sealing means for maintaining a controlled moisture environment at its interior, said transport means is an electrically conductive drum, securing means is provided for attaching said sheet to said drum, releasing means is provided for removing said sheet from said drum, and fusing means is provided in said housing for fixing said developed image to said sheet.

9. The fluid jet ion projection copier as defined in claim 8 characterized in that said drum is air permeable, said securing means is a source of low air pressure connected to the interior of said drum, and said means for releasing is an air impermeable member located adjacent to the interior of said drum.

10. The fluid jet ion projection copier as defined in claim 8 characterized by further including heating means at the exterior of said housing for driving moisture out of said sheet, and cooling means at the interior of said housing for reducing the temperature of said sheet prior to projecting ions thereon.

11. The fluid jet ion projection copier as defined in claim 7 characterized in that said charge receptor comprises an electrically conductive drum bearing an insulating coating on its surface.

12. The fluid jet ion projection copier as defined in claim 11 characterized by further comprising means for transferring a developed image from said insulating coating to a copy sheet, and means for fixing the developed image on said copy sheet.

13. The fluid jet ion projection copier as defined in claim 7 characterized by further including illumination means directed at said original, and means for receiving said illumination and focussing the image of said original on said curved illumination entry surface.

* * * * *